United States Patent Office 3,041,293
Patented June 26, 1962

3,041,293
POLYURETHANE FOAM CONTAINING TRIS-2-(1,3-DICHLOROPROPYL) PHOSPHATE AND METHOD FOR PREPARING SAME
Robert J. Polacek, Madison, N.J., assignor to Celanese Corporation of America, New York, N.Y., a corporation of Delaware
No Drawing. Filed Dec. 6, 1957, Ser. No. 700,947
15 Claims. (Cl. 260—2.5)

This invention relates to polyurethane foams, and more specifically concerns foams having flame retardant additives incorporated therein.

Flexible polyurethane foams have been modified by the addition thereto of halogenated phosphate esters which serve as plasticizers and which also function as flame retardant agents. In the case of rigid foams, the materials serve principally the latter function. It has been found that in a number of cases, such addition agents impair certain of the properties of the unmodified foam. Thus, when using certain halogenated phosphate ester flame retardants, the foam shows a relatively large loss of compressive strength after being subjected to humidity aging condition.

An object of this invention is to provide a composition convertible into a polyurethane foam, which includes a halogenated phosphate ester flame retardant material which does not adversely affect the compressive strength of the foam after the same has been exposed to humidity aging.

A further object of this invention is to provide a composition for forming polyurethane foams which includes a particular organic chlorinated phosphate flame retardant plasticizer which has good hydrolytic stability under conditions of accelerated humidity aging, thereby enhancing the stability characteristics of the foam.

Other objects of this invention will be apparent from the detailed description which follows and the appended claims.

It has been found that polyurethane foams which have incorporated therein flame retardant materials such as tris (β-chloroethyl) phosphate, show a somewhat marked impairment of certain physical properties, such as compressive strength thereof after humidity aging.

However, upon using tris-2-(1,3-dichloropropyl) phosphate as a flame retardant plasticizer in the polyurethane foam forming composition, the resultant foam showed a very substantial retention of compressive strength after humidity aging. Also, a very small proportion of lithium carbonate, further improves the resistance of the resultant foam to a reduction in compressive strength despite humidity aging.

While it is not desired to be bound by any particular theory of operation, it is believed that the enhanced stability of foams containing tris-2-(1,3-dichloropropyl) phosphate is due to the symmetrical positioning of the chlorine atoms on the carbon atoms in the positions adjacent to the carbon atoms linked to the phosphate oxygen. This positioning results in a more stable bond and prevents the release of hydrochloric acid which contributes to the hydrolytic instability of the urethane linkage.

Polyurethane foams are formed from compositions which include as essential ingredients, a polymer containing free hydroxy groups, such as hydroxyl terminated polyester or polyether, an organic diisocyanate, and a small amount of water. For best results, a catalyst, preferably an amine catalyst, and an emulsifier are also included. Such compositions may be foamed and otherwise treated in a manner known in the art to produce the desired flexible porous product. The composition usually contains a small amount of a plasticizer, which preferably, also acts as a flame retardant.

The polyester may be derived from a reaction product of a dicarboxylic acid such as adipic acid, and a dihydric alcohol such as diethylene glycol, and may be modified with a polyhydroxy compound such as trimethylol propane. Other polyesters, known in the art may be used in the same manner.

Typical polyethers are also known in the art. One of those which may be used is polyoxypropylene glycol, having a molecular weight of 2000 to 3000. The diisocyanate may be a tolylene diisocyanate and the catalyst may be of the amine type such as N-methyl morpholine. Tris-2-(1,3-dichloropropyl) phosphate does not react with amine catalysts under the reaction conditions used in the preparation of the polyurethane foam. Various emulsifiers may be used, in a manner known in the art.

In accordance with the invention, formulations were prepared for conversion into flexible polyurethane foams, as follows:

Table No. 1

|  | Parts by Weight | | |
|---|---|---|---|
|  | A | B | C |
| Polyester | 100 | 100 | 100 |
| Tolylene Diisocyanate | 40 | 40 | 40 |
| Emcol H77 | 2 | 2 | 2 |
| N-Methyl Morpholine | 2 | 2 | 2 |
| Water | 4 | 4 | 4 |
| Tris-2-(1,3-Dichloropropyl) Phosphate | 7 | 7 |  |
| Lithium Carbonate |  | 1.4 |  |
| Tris (β-Chlorethyl) Phosphate |  |  | 7 |

The polyester used is a polyester of diethylene glycol and adipic acid, modified with a minor amount of trimethylol propane, and having an average molecular weight of about 2000. The tolylene diisocyanate used is a liquid mixture of 2,4 and 2,6 isomers, in the proportion of about 80% of the former and 20% of the latter. Emcol H77 is a light amber clear liquid consisting of a balanced blend of polyhydroxy alcohols incompletely esterified with higher fatty acids and partially esterified with dicarboxylic acids.

Each of the formulations, A, B and C, was converted into a flexible polyurethane foam, in a manner known in the art and the foams were tested as to their physical properties as shown in the following table:

Table No. 2

|  | A | B | C |
|---|---|---|---|
| Density, lbs./ft.³ | 3.6 | 3.1 | 3.9 |
| Compression (before aging) (Load necessary for 25% deflection), p.s.i. | 1.3 | 0.87 | 1.09 |
| Compression (after humidity aging) (Load necessary for 25% deflection), p.s.i. | 0.96 | 0.80 | 0.11 |
| Compression Load Deflection Loss, percent | 25.6 | 8.0 | 90.0 |
| Compression set, constant deflection (before aging), percent | 3.7 | 3.5 | 6.4 |
| Compression set, constant deflection (after aging), percent | 12.0 | 8.3 | 50.0 |
| Compression set, constant load, percent | 2.9 | 3.7 | 4.0 |
| Tensile strength, p.s.i. | 35.0 | 22.1 | 34.9 |
| Tensile stress @ 50% elongation, p.s.i. | 10.8 | 4.3 | 10.8 |
| Total elongation, percent | 264 | 235 | 246 |

The humidity aging in the foregoing tests consisted of maintaining the samples in an atmosphere of 100% humidity at 158° F. for a period of two weeks. Properties not otherwise indicated were tested on unaged samples.

It will be apparent that the use of tris 2-(1,3-dichloropropyl) phosphate results in a very substantial retention of the compressive strength of the foam after humidity aging, as compared to that obtained with the conventional plasticizer, tris (β-chloroethyl) phosphate. Also, the addition of lithium carbonate to the plasticized composition improved this factor even further and thus more nearly approached the compressive strength of the foam before aging.

The proportion of tris 2-(1,3-dichloropropyl) phosphate to the remaining ingredients of the formulations which may be converted into flexible or rigid polyurethane foams, may be varied from 3 to 15 parts by weight to 100 parts of polyurethane polymer.

Also, the lithium carbonate may be used in amounts ranging from 0.5 part to 2 parts by weight to 5 parts of tris-2-(1,3-dichloropropyl) phosphate.

It is understood that the tris-2-(1,3-dichloropropyl) phosphate may be incorporated in various formulations of free hydroxy group-containing polymers and organic diisocyanates to enhance the physical properties thereof while functioning as a flame retardant plasticizer, and further, lithium carbonate may also be utilized in such formulations.

It is to be understood that the foregoing detailed description is given merely by way of illustration and that many variations may be made therein without departing from the spirit of my invention.

Having described my invention what I desire to secure by Letters Patent is:

1. In a polyurethane foam produced by reaction of an organic diisocyanate and a polymer selected from the group consisting of hydroxyl-terminated polyesters and hydroxyl-terminated polyethers and having incorporated therein a flame retardant, the improvement which comprises utilizing as said flame retardant, tris-2-(1,3-dichloropropyl) phosphate, said foam being resistant to breakdown under conditions of humidity aging.

2. A polyurethane foam as in claim 1 wherein said tris-2-(1,3-dichloropropyl) phosphate amounts to about 5–10% of the weight of said foam.

3. In a polyurethane foam comprising the reaction product of a polymer containing free hydroxy groups selected from the group consisting of hydroxyl terminated polyesters and hydroxyl terminated polyethers, an organic diisocyanate and water, the improvement which comprises incorporating in said reaction product a flame retardant material comprising tris-2-(1,3-dichloropropyl) phosphate.

4. A foam as in claim 3 wherein said polymer is a polyester.

5. A foam as in claim 4 wherein said polyester is a reaction product of diethylene glycol and adipic acid, and said phosphate is present in an amount of 5–10% by weight of the foam.

6. A foam as in claim 3 wherein said polymer is a polyether.

7. A foam as in claim 3 wherein said reaction product further includes from 0.1 to 0.4 part of lithium carbonate per part of trisdichloropropyl phosphate.

8. In a production of a polyurethane foam wherein an organic diisocyanate, a polymer containing free hydroxy groups selected from the group consisting of hydroxyl terminated polyesters and hydroxyl terminated polyethers and water are mixed and reacted to produce a foam, the improvement which comprises mixing in with the reactants tris-dichloropropyl phosphate whereby the flame resistance of the resulting foam is improved.

9. The process of claim 8, wherein said polymer is a polyester.

10. The process of claim 8, wherein there is also mixed in from 0.1 to 0.4 part of lithium carbonate per part of trisdichloropropyl phosphate.

11. The process of claim 8, wherein said tris-dichloropropyl phosphate is added in amount sufficient to provide 3 to 15 parts by weight thereof per 100 parts of the resulting polyurethane foam.

12. The process which comprises mixing together about 100 parts by weight of a polyhydroxy modified polyester, about 40 parts by weight of tolylene diisocyanate, about 2 parts by weight of N-methyl morpholine, about 4 parts by weight of water, about 2 parts by weight of an emulsifier and about 7 parts by weight of tris-dichloropropyl phosphate, whereby there is produced a flame retardant flexible polyurethane foam.

13. The process of claim 12, wherein said polyester comprises the reaction product of diethylene glycol and adipic acid and said polyhydroxy modifier is trimethylol propane.

14. The process of claim 12, wherein there is also mixed in about 1.4 parts by weight of lithium carbonate.

15. The process which comprises mixing together about 100 parts by weight of a polyhydroxy modified polyester, about 90 parts by weight of tolylene diisocyanate, about 0.5 part by weight of N-methyl morpholine, about 3.5 parts by weight of water, about 0.7 part by weight of an emulsifier and about 19 parts by weight of tris-dichloropropyl phosphate, whereby there is produced a flame retardant rigid polyurethane foam.

References Cited in the file of this patent
UNITED STATES PATENTS
2,577,281    Simon et al. _____ Dec. 4, 1951